US012607541B2

(12) United States Patent
Inoue

(10) Patent No.: US 12,607,541 B2
(45) Date of Patent: Apr. 21, 2026

(54) ROBUST PREDICTIVE MAINTENANCE METHOD FOR MACHINERY USING MEASURED VIBRATION DATA AND ESTIMATED SOUND DATA

(71) Applicant: Hitachi, Ltd., Tokyo (JP)

(72) Inventor: Akira Inoue, Farmington Hills, MI (US)

(73) Assignee: HITACHI, LTD., Tokyo (JP)

( * ) Notice: Subject to any disclaimer, the term of this patent is extended or adjusted under 35 U.S.C. 154(b) by 595 days.

(21) Appl. No.: 18/105,588

(22) Filed: Feb. 3, 2023

(65) Prior Publication Data

US 2024/0264045 A1     Aug. 8, 2024

(51) Int. Cl.
| | |
|---|---|
| *G06F 11/30* | (2006.01) |
| *G01M 99/00* | (2011.01) |
| *H04R 3/00* | (2006.01) |

(52) U.S. Cl.
CPC ............ *G01M 99/005* (2013.01); *H04R 3/00* (2013.01)

(58) Field of Classification Search
CPC .................................................. G01M 99/005
See application file for complete search history.

(56) References Cited

U.S. PATENT DOCUMENTS

| | | | |
|---|---|---|---|
| 6,757,394 B2 * | 6/2004 | Matsuo .................. | H04R 3/005 |
| | | | 381/91 |
| 2014/0156032 A1 | 6/2014 | Jenkins et al. | |
| 2019/0331522 A1 * | 10/2019 | Celikel ................. | G01M 15/12 |
| 2020/0150643 A1 | 5/2020 | Cella et al. | |

OTHER PUBLICATIONS

Inoue et al. "An Application of the Particle Velocity Transfer Path Analysis to a Hybrid Electric Vehicle Motor Sound." SAE Int. J. 2(2): May 13, 2013. 11 pages.

* cited by examiner

*Primary Examiner* — Phuong Huynh

(74) *Attorney, Agent, or Firm* — PROCOPIO, CORY, HARGREAVES & SAVITCH LLP

(57) ABSTRACT

In example implementations described herein, there are systems and methods for performing predictive maintenance which can include collecting vibration data related to an operation of a first machine during a first time period, computing sound data related to the operation of the first machine during the first time period based on the collected vibration data, and predicting, based on the computed sound data, at least one value associated with a maintenance of the first machine. In some aspects, the systems and methods may further include measuring an acoustic transfer function relating the vibration data related to the operation of the first machine to one or more of the sound pressure data or the particle velocity data.

17 Claims, 9 Drawing Sheets

$410 \nearrow$ $$Q^{Op}(w) = a^{Op}(w)A$$

$420 \nearrow$ $$\rho^{Op}(w) = \left(\frac{\rho}{Q}\right)^{Pre}(w)\, Q^{Op}(w)$$

Figure 4:
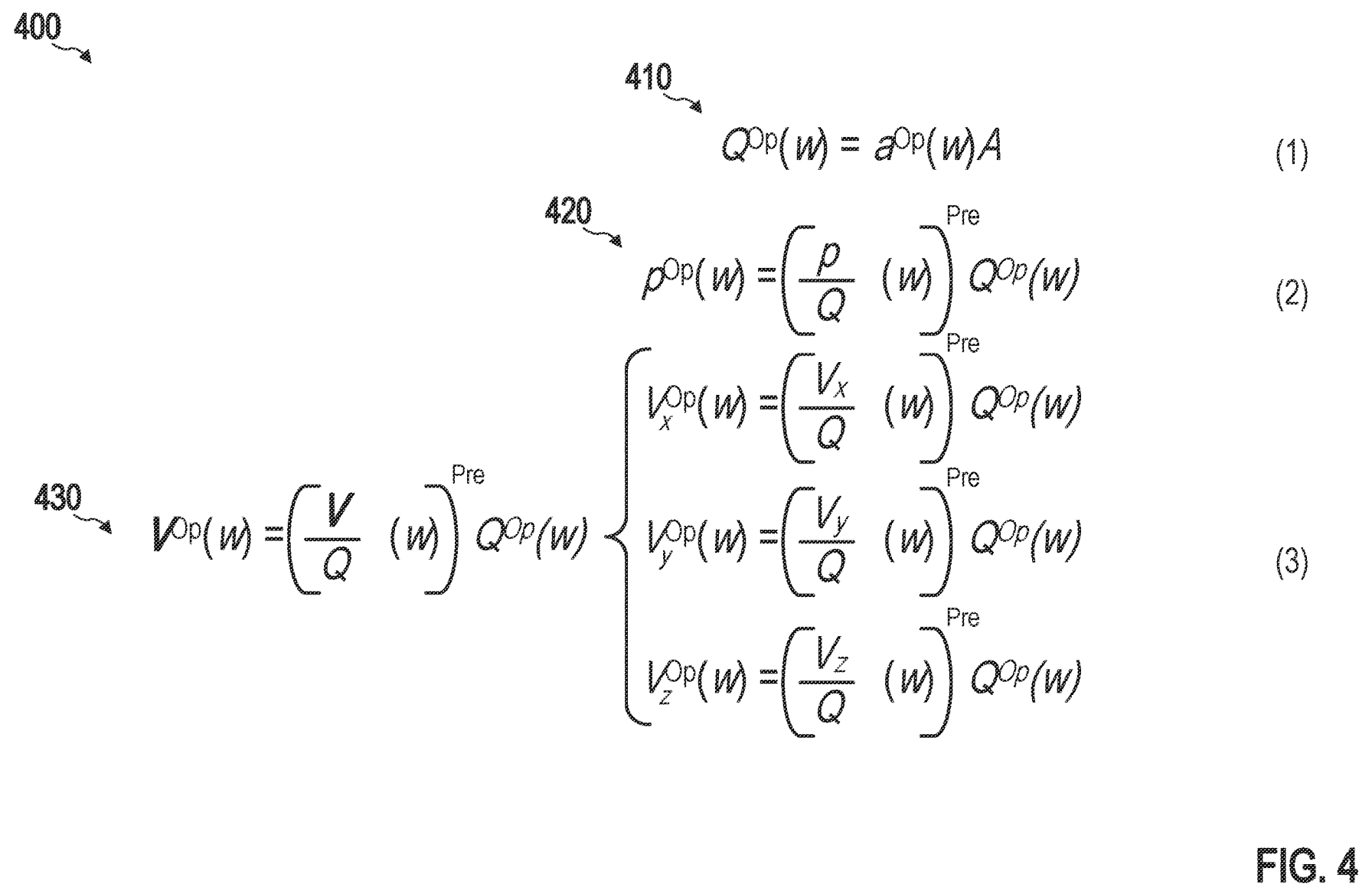

$$V_x^{Op}(w) = \left(\frac{V_x}{Q}\right)^{Pre}(w)\, Q^{Op}(w)$$

$$V_y^{Op}(w) = \left(\frac{V_y}{Q}\right)^{Pre}(w)\, Q^{Op}(w)$$

$$V_z^{Op}(w) = \left(\frac{V_z}{Q}\right)^{Pre}(w)\, Q^{Op}(w)$$

$430 \nearrow$ $$V^{Op}(w) = \left(\frac{V}{Q}\right)^{Pre}(w)\, Q^{Op}(w)$$

$400 \nearrow$

700

710 collect vibration data related to an operation of a first machine during a first time period

712 compute sound data related to the operation of the first machine during the first time period based on the collected vibration data

714 predict, based on the generated sound data, at least one value associated with a maintenance of the first machine

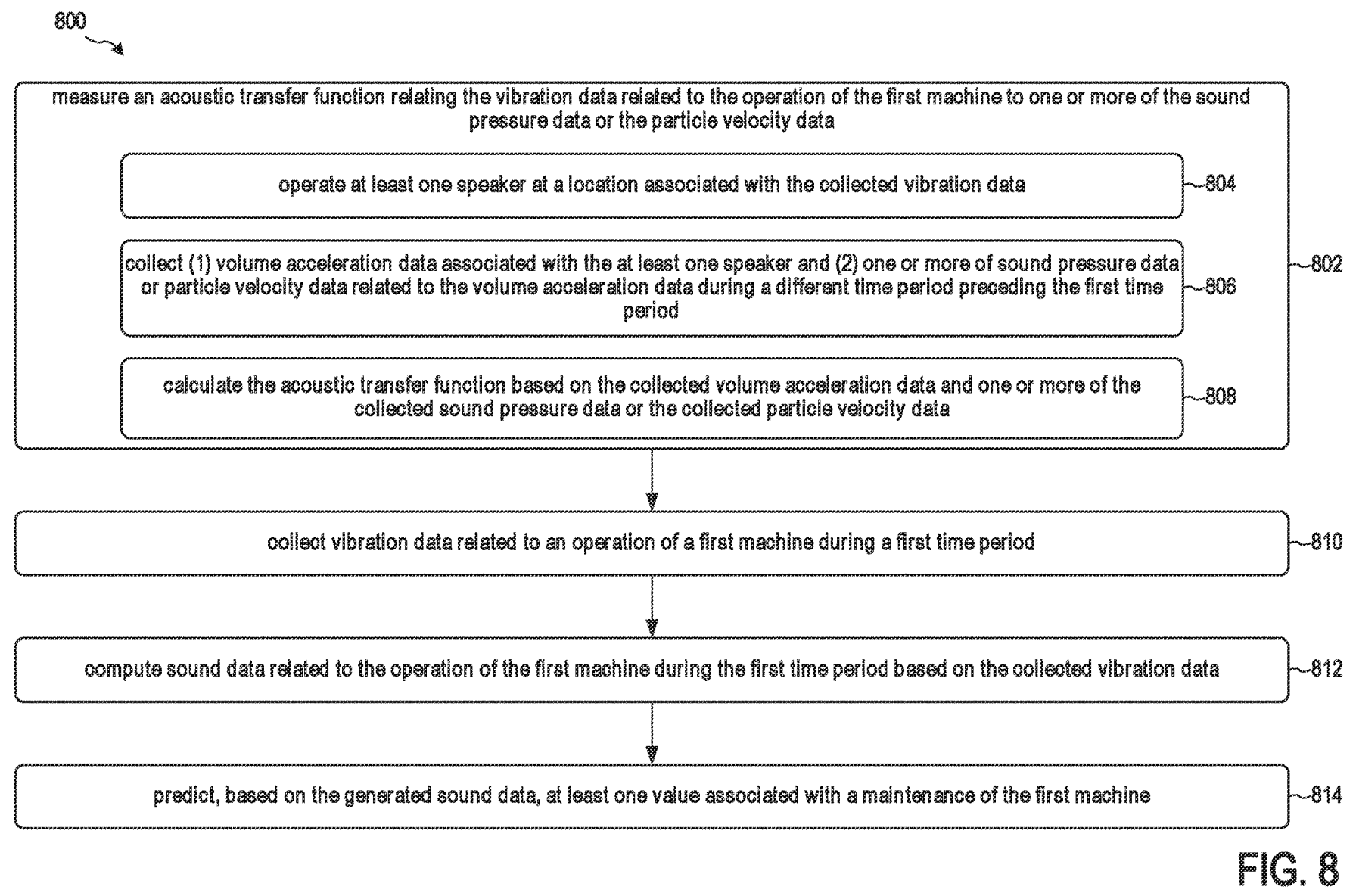

800

802 — measure an acoustic transfer function relating the vibration data related to the operation of the first machine to one or more of the sound pressure data or the particle velocity data 804 — operate at least one speaker at a location associated with the collected vibration data 806 — collect (1) volume acceleration data associated with the at least one speaker and (2) one or more of sound pressure data or particle velocity data related to the volume acceleration data during a different time period preceding the first time period 808 — calculate the acoustic transfer function based on the collected volume acceleration data and one or more of the collected sound pressure data or the collected particle velocity data 810 — collect vibration data related to an operation of a first machine during a first time period 812 — compute sound data related to the operation of the first machine during the first time period based on the collected vibration data 814 — predict, based on the generated sound data, at least one value associated with a maintenance of the first machine

FIG. 8

ROBUST PREDICTIVE MAINTENANCE METHOD FOR MACHINERY USING MEASURED VIBRATION DATA AND ESTIMATED SOUND DATA

BACKGROUND

Field

The present disclosure is generally directed to sound and/or vibration monitoring for predictive maintenance.

Related Art

In some industrial environments vibration and/or sound monitoring is performed to identify possible maintenance issues with a set of monitored machines. For example, the monitoring may be used for a predictive maintenance to predict and plan for machine breakdown to avoid downtime and extra cost resulting from an unexpected machine breakdown. Vibration is typically measured by an accelerometer sensor attached on a monitored machine or structure. Vibration information is good to find detailed conditions of the machine near the sensor. However, vibration information, in some instances, may not be useful for monitoring conditions far from the point where the sensor is attached. For example, vibrations may intentionally be damped across a machine or across different parts of a machine to provide vibrational isolation or may be damped unintentionally by the structure of, or vibrational path through, the machine.

Sound is typically measured by a microphone placed in the vicinity of, or around, the machine. Sound information is often useful to monitor the overall, or primary, conditions of a monitored machine. However, acoustic noise in the surrounding is often non-negligible, and disturbs the sound analysis. Therefore, to monitor a machine condition for condition-based or predictive maintenance, it is desirable to use both sound data and vibration data (e.g., complementary data). However, to use both sound and vibration sensors (i.e., a microphone and an accelerometer) may be costly. Additionally, when a microphone is at a node of a standing wave associated with a particular set of frequencies, sound pressure may be zero, or close to zero. At frequencies in the particular set of frequencies, little, or no, useful acoustic data may be available.

An apparatus and method are presented below to provide the benefits of monitoring both vibration and sound (acoustic) data without the associated additional costs and limitations of monitoring sound in a noisy industrial environment.

SUMMARY

Example implementations described herein involve an innovative method and apparatus to utilize measured vibration and estimated sound, to perform monitoring for predictive maintenance. The vibration may be monitored directly and the sound may be monitored indirectly through the monitored vibration. The sound may be estimated and/or computed in the frequency domain based on the measured vibration data and a pre-measured acoustic transfer function relating a set of acoustic (sound) data captured under optimized conditions to a set of vibration data. The optimized conditions may include operating a speaker at the vibration monitoring point associated with a particular vibration sensor (e.g., accelerometer) in isolation during a quiet time (e.g., during a non-working or down time such as after workers leave and/or when machines are turned off). The acoustic data may be measured by one or more microphones at a set of one or more locations to capture multiple sets of acoustic data to generate the acoustic transfer function. Accordingly, microphones may be used for measuring the acoustic transfer function but not during a run-time or on a real time basis. The reduced use of the microphones removes the costs associated with "full-time" acoustic monitoring. For example, the number of microphones may be reduced as the same microphone(s) may be used to measure the acoustic transfer function for multiple monitored machines and the costs of operating the microphones "full-time" may also be reduced or eliminated.

Aspects of the present disclosure include a method for utilize measured vibration and estimated sound, to perform monitoring for predictive maintenance. The method may comprise collecting vibration data related to an operation of a first machine during a first time period; generating sound data related to the operation of the first machine during the first time period based on the collected vibration data; and predicting, based on the generated sound data, at least one value associated with a maintenance of the first machine.

Aspects of the present disclosure include a non-transitory computer readable medium, storing instructions for execution by a processor, which can involve instructions for collecting vibration data related to an operation of a first machine during a first time period; generating sound data related to the operation of the first machine during the first time period based on the collected vibration data; and predicting, based on the generated sound data, at least one value associated with a maintenance of the first machine.

Aspects of the present disclosure include a system, which can involve means for collecting vibration data related to an operation of a first machine during a first time period; generating sound data related to the operation of the first machine during the first time period based on the collected vibration data; and predicting, based on the generated sound data, at least one value associated with a maintenance of the first machine.

Aspects of the present disclosure include an apparatus, which can involve a processor, configured to collect vibration data related to an operation of a first machine during a first time period; generate sound data related to the operation of the first machine during the first time period based on the collected vibration data; and predict, based on the generated sound data, at least one value associated with a maintenance of the first machine.

BRIEF DESCRIPTION OF DRAWINGS

FIG. 4 is a diagram illustrating a computation and/or generation of sound data in accordance with some aspects of the disclosure.

FIG. 8 is a flow diagram illustrating a method in accordance with some aspects of the disclosure.

DETAILED DESCRIPTION

Figure 1:
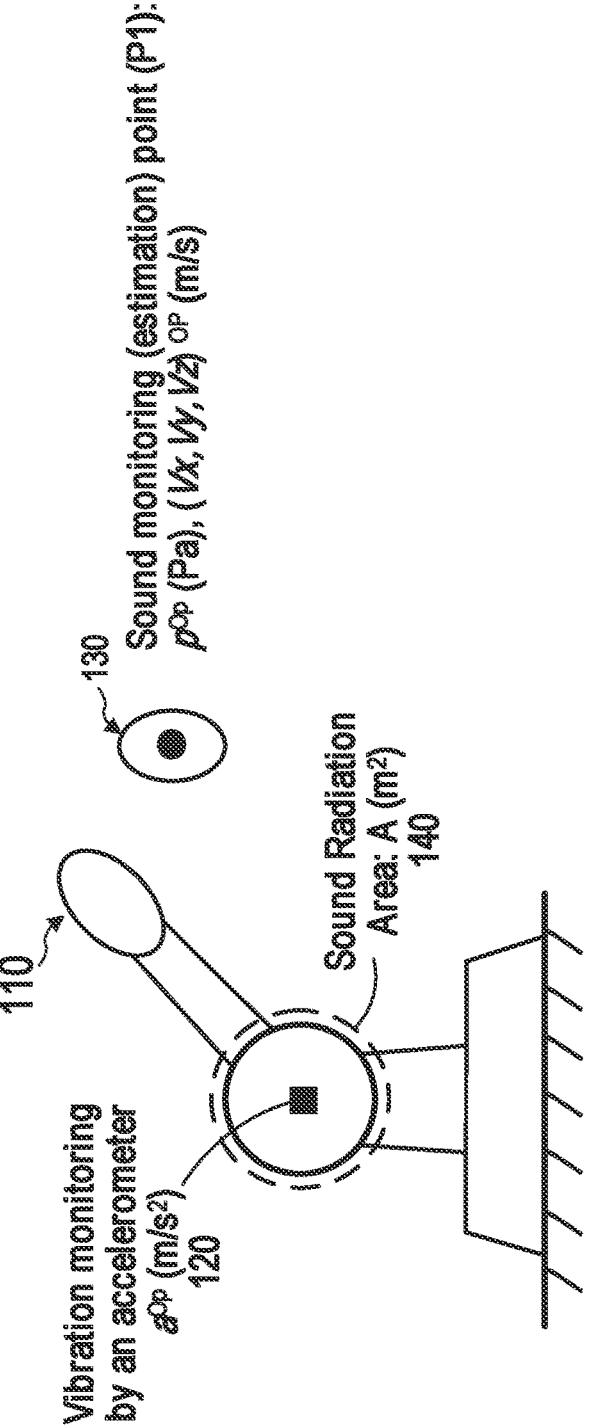
FIG. 1 is a diagram illustrating an example environment for sound and vibration monitoring.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of the ordinary skills in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Example implementations described herein involve an innovative method to utilize measured vibration and estimated sound, to perform monitoring for predictive maintenance. The vibration may be monitored directly and the sound may be monitored indirectly through the monitored vibration. The sound may be estimated and/or computed in the frequency domain based on the measured vibration data and a pre-measured acoustic transfer function relating a set of acoustic (sound) data captured under optimized conditions to a set of vibration data. The optimized conditions may include operating a speaker at the vibration monitoring point associated with a particular vibration sensor (e.g., accelerometer) in isolation during a quiet time (e.g., during a non-working or down time such as after workers leave and/or when machines are turned off). The acoustic data may be measured by one or more microphones at a set of one or more locations to capture one or more sets of acoustic data to generate one or more acoustic transfer functions at each of the set of one or more locations. Accordingly, microphones may be used for measuring the acoustic transfer function but not during a run-time, or on a real time, basis. The reduced use of the microphones removes the costs associated with "full-time" acoustic monitoring. For example, the number of microphones may be reduced as the same microphone(s) may be used to measure the acoustic transfer function for multiple monitored machines and the costs of operating the microphones "full-time" may also be reduced or eliminated.

Sound monitoring typically has a noise issue. For example, when a microphone is placed near a machine in a factory, there are usually many other sound sources (e.g., other machines in operations). On the other hand, vibration data usually have much less noise than sound data. The acoustic transfer function can be measured, when the surrounding environment is quiet (e.g., at night in the factory).

Therefore, by using the vibration data with the acoustic transfer function, estimated sound can have less noise than directly measured sound. Consequently, the following analysis (e.g., predictive maintenance) becomes more accurate.

FIG. 1 is a diagram 100 illustrating an example environment for sound and vibration monitoring. Diagram 100 illustrates a robotic arm 110 as an example of a machine to be monitored. The robotic arm 110 may be monitored by a vibration monitor 120 (e.g., an accelerometer) at a particular location on the robotic arm 110. The vibration associated with the particular location on the robotic arm 110 may be associated with a sound radiation area 140. However, sound monitoring may be associated with a sound monitoring point 130. The sound monitoring point may be associated with a data set including a pressure $P^{Op}$ (e.g., a sound pressure during operation (Op) measured in Pa) and a particle velocity vector $V^{Op}$ including a set of vector components (e.g., $V_x^{Op}$, $V_y^{Op}$, $V_z^{Op}$) (measured in m/s).

If the sound monitoring point 130 is placed at a node of a standing wave (for a particular frequency) of the room, sound pressure (e.g., $P^{Op}$) may be (close to) zero. At the particular frequency, there may be little, or insufficient, acoustic data available. However, even when sound pressure is zero (or close to zero) because of the placement at the node, particle velocity may be, and often is, non-zero. Therefore, by using both sound pressure and particle velocity, the following data analysis can cover the entire frequency range.

The disclosure enables monitoring vibration and sound for machinery or a structure by monitoring vibration only. The disclosure describes a method and apparatus that saves the costs incurred by monitoring by microphone while maintaining the operational efficiency using both vibration and sound for monitoring. Sound is monitored, in some aspects, through estimation.

Figure 2:
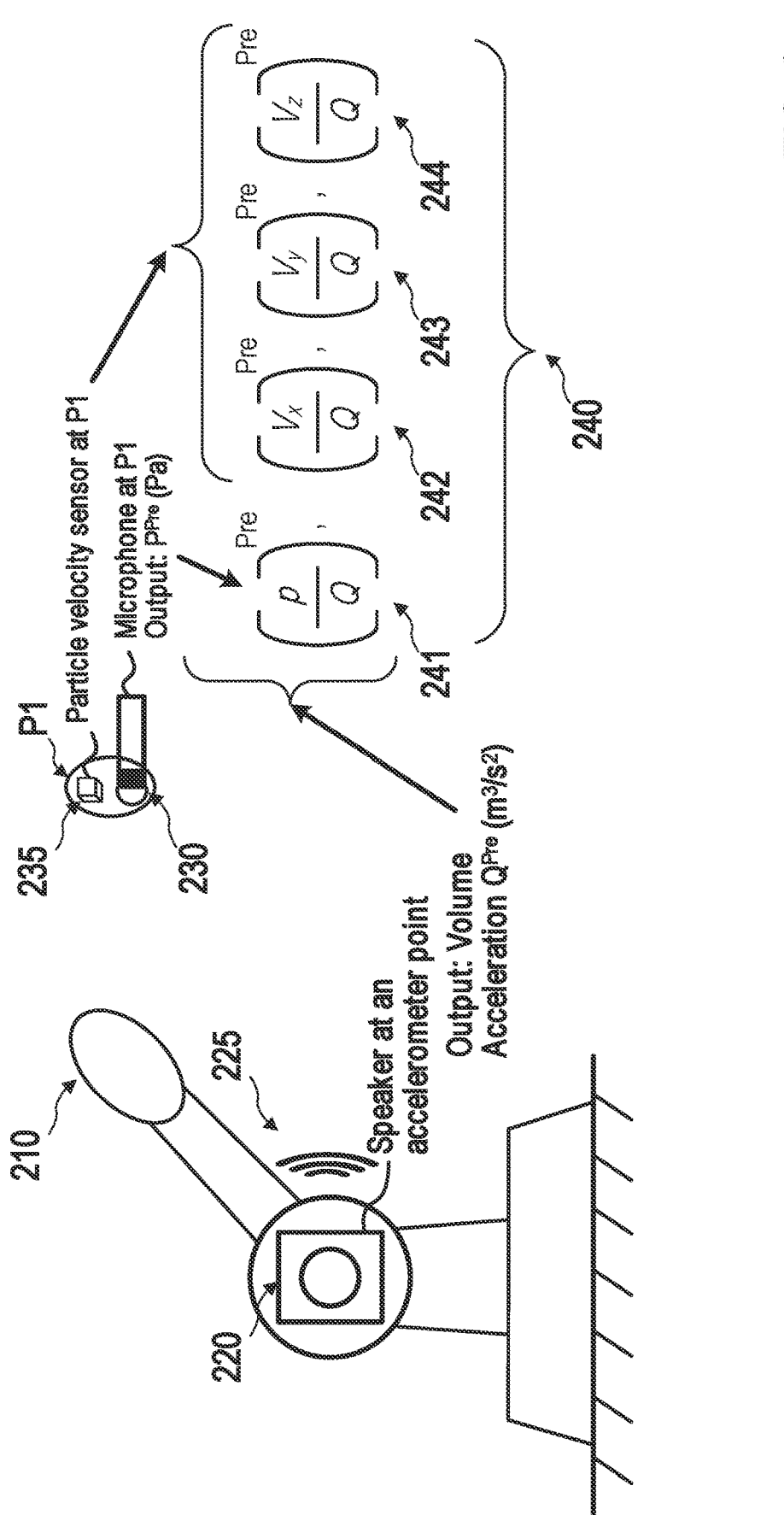
FIG. 2 is a diagram illustrating an example environment for measuring an acoustic transfer function that relates sound and/or vibration at a monitored machine to a measured sound (e.g., pressure and/or particle velocity) at a particular point in the environment of the monitored machine.

FIG. 2 is a diagram 200 illustrating an example environment for measuring an acoustic transfer function that relates sound and/or vibration at a monitored machine to a measured sound (e.g., pressure and/or particle velocity) at a particular point in the environment of the monitored machine. Diagram 200 includes a robotic arm 210 as an example of a monitored machine. The robotic arm 210 may be associated with a speaker 220 at a location of a vibration monitor (e.g., the location of the vibration monitor 120 in FIG. 1). The measuring of the acoustic transfer function may be done at a quiet time, e.g., at a time when machines are not running and ambient noise is low such as at night. The speaker 220 may, at the quiet time, be operated at the location of the vibration monitor to produce sound 225 at a range of frequencies. The produced sound 225, in some aspects, may be associated with known values and/or collected data for an associated volume acceleration (e.g., a pre-measured (Pre) volume acceleration value and/or data, such as amplitude or phase values and/or data, which may be a function of time or frequency ($Q^{Pre}$) measured in m³/s²). In some aspects, the produced sound 225 may be associated with known values and/or collected data regarding a sound amplitude as a function of time or frequency. A microphone 230 and/or a particle velocity measurement device 235 (e.g., a particle velocity sensor) at a measurement location "P1" may be used to collect one or more of sound pressure data (e.g., $P^{Pre}$) and/or particle velocity data (e.g., $V_x^{Pre}$, $V_y^{Pre}$, $V_z^{Pre}$) related to the volume acceleration data and/or the amplitude data associated with the operation of the speaker 220. The quiet time may be a time period preceding a time period during which monitoring for predictive maintenance is performed.

An acoustic transfer function 240 may be measured and/or calculated based on the known values and/or collected data for the associated volume acceleration data (e.g., $Q^{Pre}$) and/or based on the known values and/or collected data for the associated sound amplitude and the collected one or more of sound pressure data (e.g., $P^{Pre}$) and/or particle velocity data (e.g., $V_x^{Pre}$, $V_y^{Pre}$, $V_z^{Pre}$). For example, the collected and/or measured pressure data $P^{Pre}$ may be used to calculate a first, pressure-related, component 241 (e.g., $(P/Q)^{Pre}$) of the acoustic transfer function 240. Additionally, the first component (e.g., $V_x^{Pre}$), second component (e.g., $V_y^{Pre}$), and third component (e.g., $V_z^{Pre}$) of the measured particle velocity may be used to calculate a first, particle-velocity related, component 242 (e.g., $(V_x/Q)^{Pre}$), a second, particle-velocity related, component 243 (e.g., $(V_y/Q)^{Pre}$), and a third, particle-velocity related, component 244 (e.g., $(V_z/Q)^{Pre}$) of the acoustic transfer function 240. In some aspects, data collected in a frequency domain may include an amplitude component and a phase component (e.g., $Q^{Pre}(\omega)=Q_{amp}^{Pre}(\omega)*\cos(Q_{phase}^{Pre}(\omega)$, $P^{Pre}(\omega)=P_{amp}^{Pre}(\omega)*\cos(P_{phase}^{Pre}(\omega))$, and $V^{iPre}(\omega)=V_{amp}^{Pre}(\omega)*\cos(V_{phase}^{Pre}(\omega)))$ while data collected in a time domain may include an amplitude component with no phase component.

Figure 3:
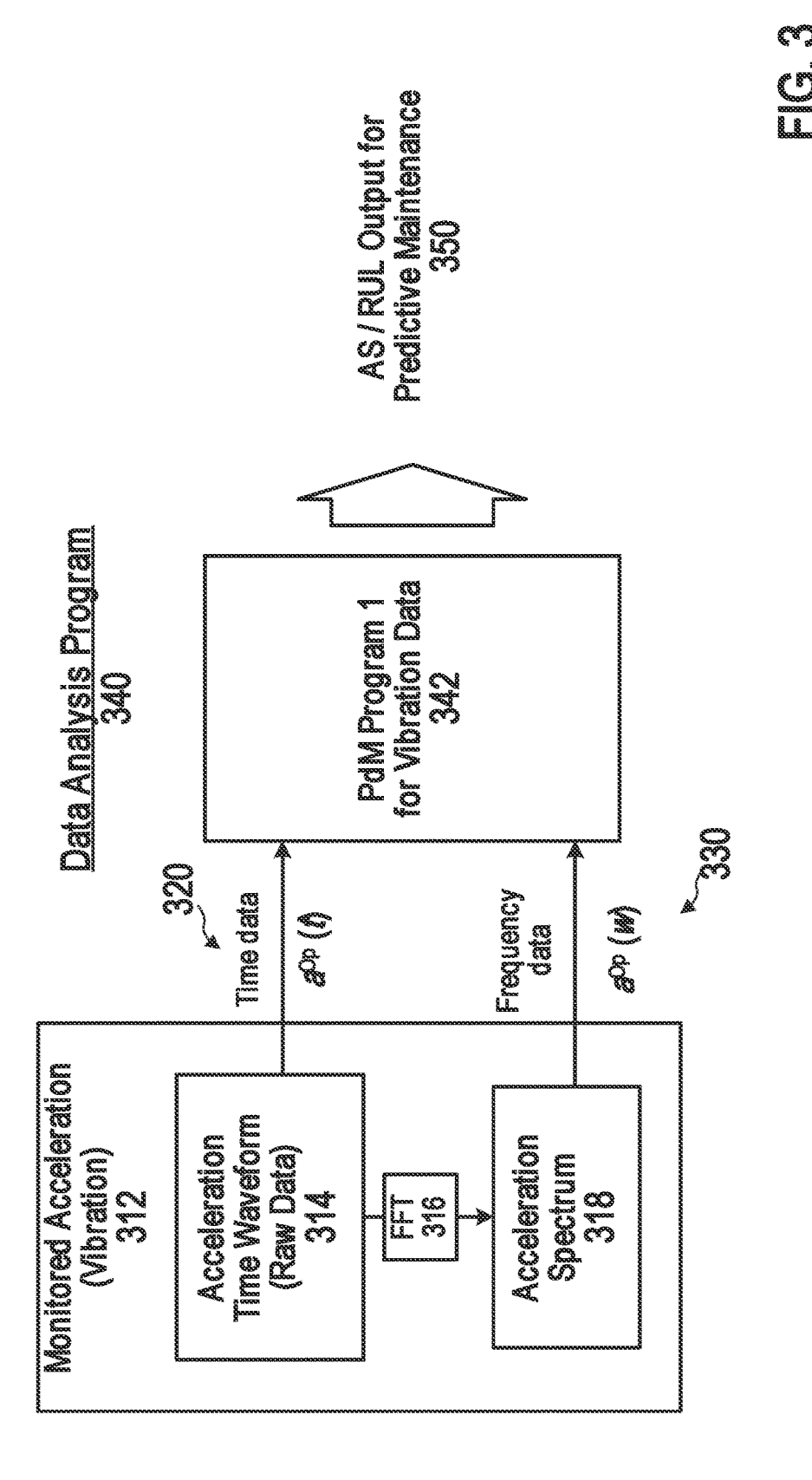
FIG. 3 is a diagram illustrating a process for acquiring vibration data and using the vibration data for predictive maintenance in accordance with some aspects of the disclosure.

FIG. 3 is a diagram 300 illustrating a process for acquiring vibration data and using the vibration data for predictive maintenance in accordance with some aspects of the disclosure. Diagram 300 includes a data acquisition program 310 that captures monitored acceleration (vibration) data 312. Capturing the monitored acceleration (vibration) data 312, in some aspects, includes capturing the monitored acceleration data 312 via an accelerometer (e.g., vibration monitor 120 of FIG. 1) at a monitoring point. The accelerometer may capture acceleration data for three degrees of freedom (e.g., associated with three cardinal directions, e.g., x, y, and z) at a sampling rate (e.g., a sampling rate selected based on the desired subsequent analysis).

The monitored acceleration data 312 may include raw waveform data 314 (e.g., acceleration over time) that includes acceleration data over time for each of the 3 degrees of freedom. The raw waveform data 314 may be processed by a fast Fourier transform (FFT) 316 to produce acceleration spectrum data 318. Accordingly, the monitored acceleration data 312 may represent a time-domain data set and the acceleration spectrum data 318 may represent a frequency domain data set. The time-domain data 320 (e.g., an acceleration vector $\vec{a}^{Op}(t)=(a_x(t), a_y(t), a_z(t))^{Op}$) and the frequency-domain data 330 (e.g., an acceleration vector $\vec{a}^{Op}(\omega)=(a_x(\omega), a_y(\omega), a_z(\omega))^{Op}$) may be provided to a data analysis program 340 (or a predictive maintenance program 342) for a predictive maintenance operation based on the vibration data (e.g., time-domain data 320 and frequency-domain data 330) to produce output for predictive maintenance 350 including, in some aspects, an anomaly score (AS) or a predicted remaining useful life (RUL).

In some aspects sound (e.g., a sound pressure and a particle velocity vector) may be estimated by using the monitored vibration and/or acceleration data (e.g., monitored acceleration data 312 of FIG. 3) based on the pre-measured acoustic transfer function (e.g., acoustic transfer function 240) between the vibration and the sound monitoring point(s). Because the acoustic transfer function can be measured in a quiet situation, the surrounding noise which exists in the machine operation can be minimized. FIG. 4 is a diagram 400 illustrating a computation and/or generation of sound data in accordance with some aspects of the disclosure.

As described in relation to FIGS. 1 and 3, a vibration monitor 120 may record time-domain acceleration data $\vec{a}^{Op}(t)$ (e.g., raw waveform data 314). As described in relation to FIG. 3, frequency-domain acceleration data $\vec{a}^{Op}(\omega)$ (e.g., acceleration spectrum data 318) may be derived and/or computed based on the time-domain acceleration data (e.g., raw waveform data 314). In turn, frequency-domain volume acceleration data $Q^{Op}(\omega)$ may be derived and/or computed by multiplying the frequency-domain acceleration data $\vec{a}^{Op}(\omega)$ by a representative area, A, as in equation (1) 410 of FIG. 4 (e.g., $Q^{Op}(\omega)=\vec{a}^{Op}(\omega)*A$).

The frequency-domain volume acceleration data $Q^{Op}(\omega)$ may then be multiplied by the components of the acoustic transfer function (e.g., components of the acoustic transfer function 241, 242, 243, and 244) to derive and/or compute sound data related to the operation of a monitored machine. For example, a pressure ($P^{Op}$) may be derived and/or computed by multiplying the frequency-domain volume acceleration data ($Q^{Op}(\omega)$) by a first, pressure-related, component of the acoustic transfer function $((P/Q(\omega))^{Pre}$) as in equation (2) 420 of FIG. 4 (e.g., $P^{Op}=(P/Q(\omega))^{Pre}*Q^{Op}(\omega)$). Particle velocity components ($V_i^{Op}$, for i=x, y, z) of a particle velocity vector ($\vec{V}^{Op}$) may be derived and/or computed by multiplying the frequency-domain volume acceleration data ($Q^{Op}(a)$) by a corresponding, velocity-related, component of the acoustic transfer function $((V_i/Q(\omega))^{Pre}$, for i=x, y, z) of a particle velocity vector component of the acoustic transfer factor $((\vec{V}/Q(\omega))^{Pre})$ (as in the set of equations (3) 430 of FIG. 4 (e.g., $\vec{V}^{Op}=(\vec{V}/Q(\omega))^{Pre}*Q^{Op}(\omega)$). In some aspects, one or two components of an acceleration vector may not contribute to the derived and/or computed sound pressure and/or particle velocity, e.g., components aligned with a plane of a vibrating surface may not contribute to a derived and/or computed sound.

Figure 5:
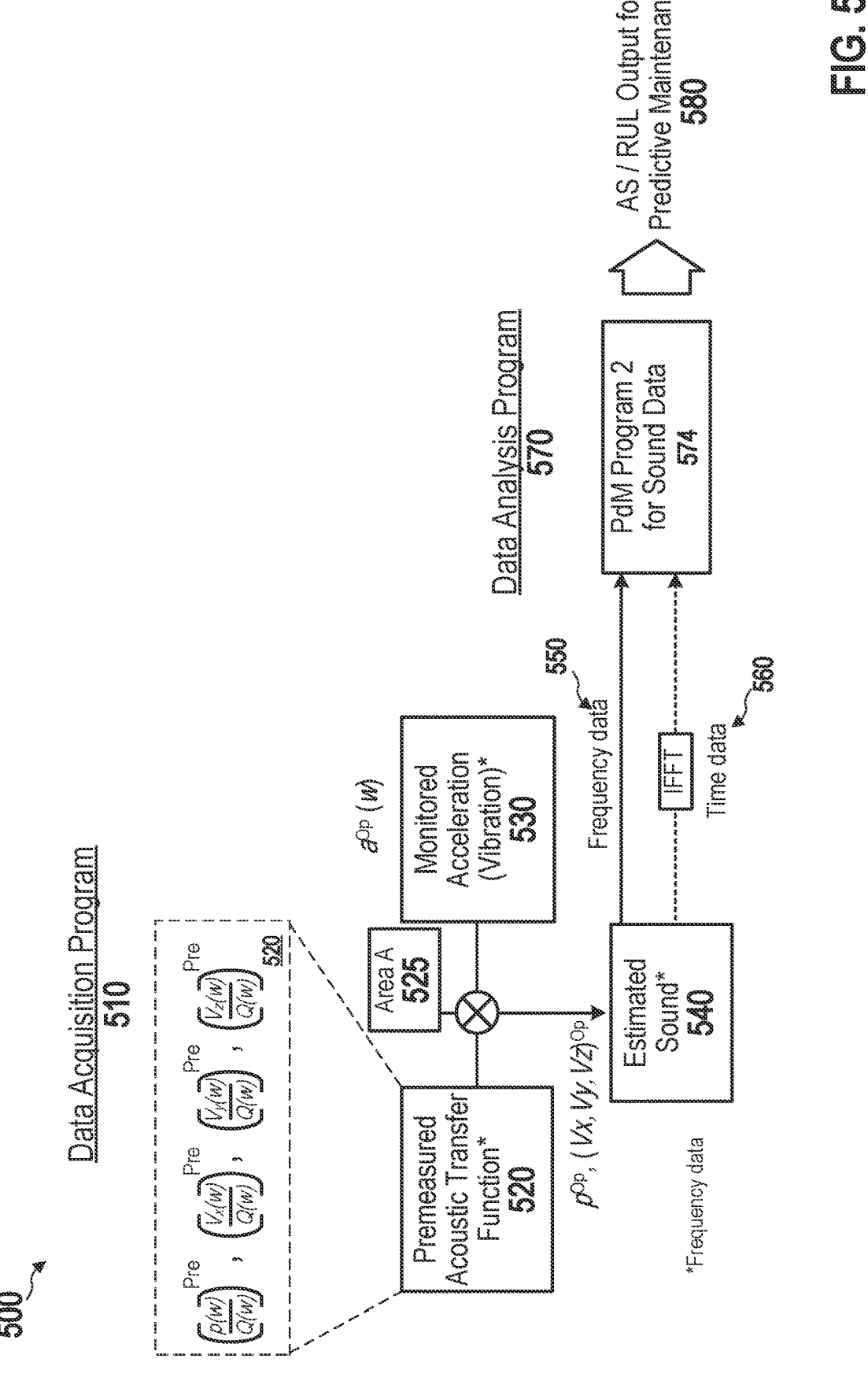
FIG. 5 is a diagram illustrates a data flow for sound estimation and a related predictive maintenance program in accordance with some aspects of the disclosure.

In some aspects, the method and apparatus disclosed may utilize sound data with 4 degrees-of-freedom, e.g., sound pressure ($P^{Op}$) and particle velocity vector ($\vec{V}^{Op}$), and a complete analysis of sound is possible. FIG. 5 is a diagram 500 illustrates a data flow for sound estimation and a related predictive maintenance program in accordance with some aspects of the disclosure. Diagram 500 illustrates that data acquisition program 510 may include components to combine a pre-measured acoustic transfer function 520 (in a frequency domain), a representative area, A, 525, and a monitored and/or measured acceleration data (in a frequency domain) 530 associated with a vibration of a machine to compute estimated sound data 540 (e.g., $P^{Op}$, $\vec{V}^{Op}$). The estimated sound data 540 may be provided to a predictive maintenance program 574 of a data analysis program 570 as frequency-domain data 550 and, after an inverse FFT (IFFT), as time-domain data 560. The predictive maintenance program 574 may produce an AS, a RUL, or other useful values and/or quantities associated with predictive maintenance as an output for predictive maintenance 580 based on the sound data. In some aspects, the predictive maintenance program 574 may use one or more sets of programs including machine-trained networks, deep learning programs, or other algorithms to produce the output for predictive maintenance 580. By utilizing the sound data with 4 degrees-of-freedom, the sound data may not suffer from a monitoring position being at a node associated with one or more frequencies, e.g., because the nodes for sound pressure and particle velocity are different as opposed to typical sound measurement of sound pressure without particular velocity, where the sound (standing wave) node issue arises.

In some aspects, vibration monitoring gives detailed condition information regarding an area and/or component near the measurement point. Sound monitoring, in some aspects, may provide information relating to the overall or general condition of a monitored machine as a whole, or a particular condition or problem associated with the monitored machine. By monitoring both vibration and sound, a predictive maintenance program, or set of programs, may be more efficient and/or accurate than a predictive maintenance program based on either vibration or sound alone.

Figure 6:
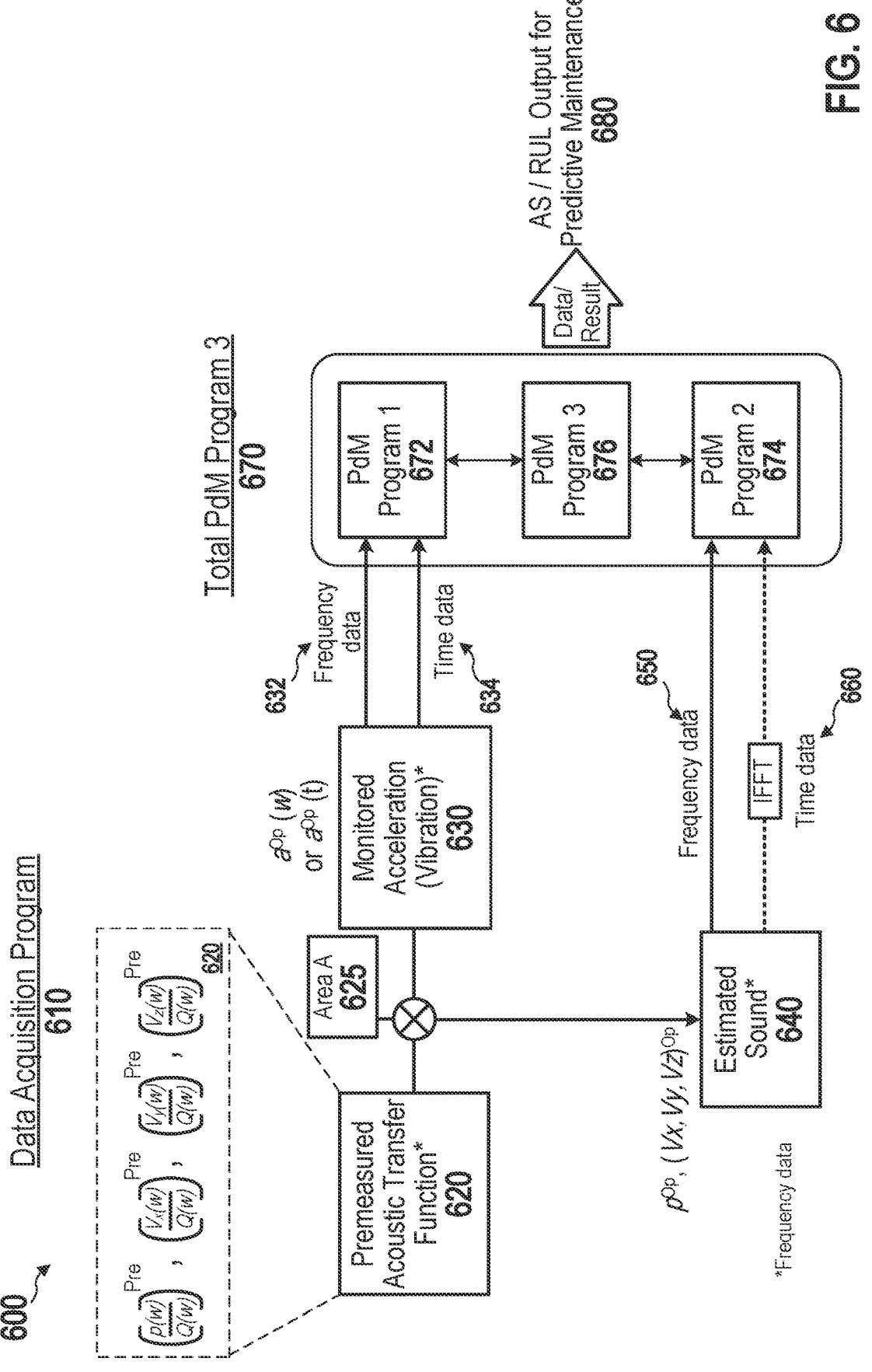
FIG. 6 is a diagram illustrating an integrated predictive maintenance method utilizing both sound and vibration data that may be performed by an apparatus in accordance with some aspects of the disclosure.

FIG. 6 is a diagram 600 illustrating an integrated predictive maintenance method utilizing both sound and vibration data that may be performed by an apparatus in accordance with some aspects of the disclosure. Diagram 600 illustrates that data acquisition program 610 may include components to combine a pre-measured acoustic transfer function 620 (in a frequency domain), a representative area, A, 625, and a monitored and/or measured acceleration data (in a frequency domain) 630 associated with a vibration of a machine to compute estimated sound data 640 (e.g., $P^{Op}$, $\vec{V}^{Op}$) as described in relation to FIGS. 4 and 5. The monitored and/or measured acceleration data 630 (in a frequency domain), in some aspects, may be provided to a total predictive maintenance program 670 as frequency-domain vibration data 632 and/or time-domain vibration data 634 (e.g., frequency-domain and time-domain acceleration vectors). The monitored and/or measured acceleration data 630 may be provided to a first predictive maintenance program 672 (e.g., corresponding to predictive maintenance program 342). Additionally, the estimated sound data 640, in some aspects, may be provided to a second predictive maintenance program 674 of the total predictive maintenance program 670 as frequency-domain data 650 and/or, after an inverse FFT (IFFT), as time-domain data 660. The first and second predictive maintenance programs 672 and 674 may interact with a third predictive maintenance program 676 that may utilize both the monitored and/or measured acceleration data 630 and/or estimated sound data 640 and/or the output of one or more of the first and second predictive maintenance programs 672 and 674 to produce an AS, a RUL, or other useful values and/or quantities associated with predictive maintenance as an output for predictive maintenance 680. In some aspects, the predictive maintenance program 674 may use one or more sets of programs including machine-trained networks, deep learning programs, or other algorithms applied to the monitored and/or measured acceleration data 630 and/or estimated sound data 640 to produce the output for predictive maintenance 680.

Figure 7:
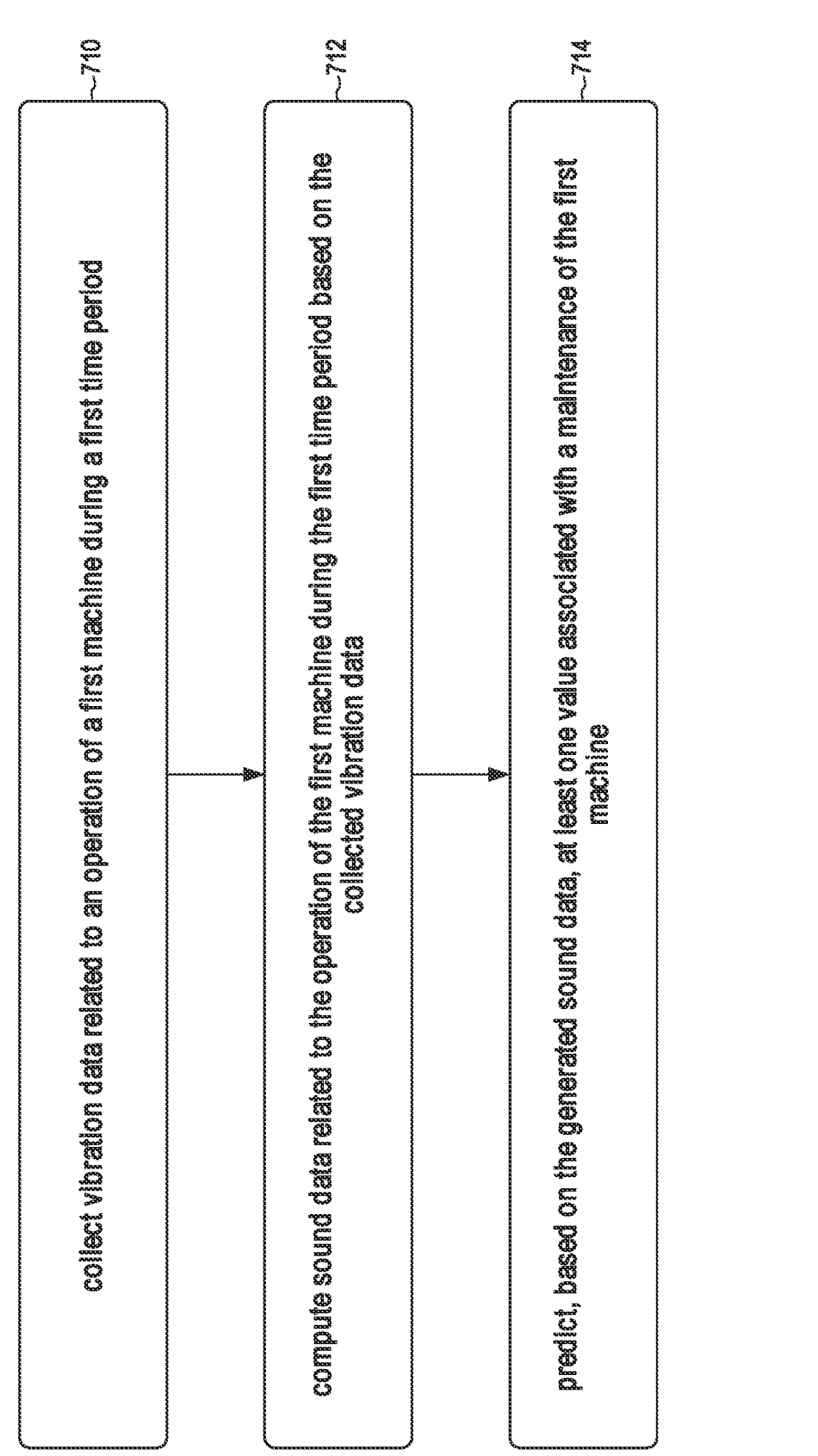
FIG. 7 is a flow diagram illustrating a method in accordance with some aspects of the disclosure.

FIG. 7 is a flow diagram 700 illustrating a method in accordance with some aspects of the disclosure. In some aspects, the method is performed by an analysis apparatus in communication with at least one vibration monitor (e.g., computing device 905 receiving vibration data via input/user interface 935 and I/O interface 925) that collects data and performs various transformations and analyses based on the collected data. At 710, the apparatus may collect vibration data related to an operation of a first machine during a first time period (e.g., a time period associated with an operation of the first machine). The collected vibration data may measure vibration data (e.g., acceleration data) in multiple dimensions (e.g., in 3 dimensions). The vibration data may be measured at a known location associated with the first machine. For example, referring to FIGS. 1, 3, 5, and 6, a vibration monitor 120 may, during an operation of the robotic arm 110 monitor and record monitored acceleration (vibration) data 312 (or monitored and/or measured acceleration data 530/630) which may include (time-domain) raw waveform data 314 and/or (frequency-domain) acceleration spectrum data 318 (e.g., derived from the raw waveform data 314).

In some aspects, before collecting the vibration data, the apparatus may measure an acoustic transfer function relating vibration data related to (or collected during) an operation of at least a first machine to one or more of a sound pressure data or a particle velocity data. In some aspects, measuring the acoustic transfer function may include operating at least one speaker at a location associated with collected vibration data (e.g., at a location of a vibration monitor such as an accelerometer). The speaker may produce a sine sweep sound or an arbitrary known sound such as a known random noise sound. For example, referring to FIG. 2, speaker 220 may be operated to produce a known sound.

Measuring the acoustic transfer function, in some aspects, may include collecting (1) volume acceleration data associated with the at least one speaker and (2) one or more of sound pressure data or particle velocity data related to the volume acceleration data during a time period preceding a time period for monitoring the first machine. The collecting operations may be performed at a quiet time during which noise is below an acceptable and/or threshold level (e.g., a threshold fraction of the collected sound during operation of the speaker). For example, referring to FIG. 2, a sensor at the speaker 220 may be used to collect the known and/or collected volume acceleration data ($Q^{Pre}$), or the volume acceleration data may be known based on a known output of the speaker 220, and the microphone 230 and the particle velocity measurement device 235 may collect one or more of sound pressure data ($P^{Pre}$) and/or particle velocity data (e.g., $V_x^{Pre}$, $V_y^{Pre}$, $V_z^{Pre}$) related to the known and/or collected volume acceleration data ($Q^{Pre}$) and/or to known or collected amplitude data associated with the operation of the speaker 220.

In some aspects, measuring the acoustic transfer function may include calculating the acoustic transfer function based on the collected volume acceleration data and one or more of the collected sound pressure data or the collected particle velocity data. For example, an acoustic transfer function vector [$(P/Q)^{Pre}$, $(V_x/Q)^{Pre}$, $(V_y/Q)^{Pre}$, $(V_z/Q)^{Pre}$] may be calculated based on the volume acceleration data ($Q^{Pre}$), the sound pressure data ($P^{Pre}$), and the (sound and/or acoustic) particle velocity data ($V_x^{Pre}$, $V_y^{Pre}$, $V_z^{Pre}$) collected. For example, referring to FIG. 2, components 241-244 (e.g., $(P/Q)^{Pre}$, $(V_x/Q)^{Pre}$, $(V_y/Q)^{Pre}$, $(V_z/Q)^{Pre}$) of the acoustic transfer function 240 may be calculated based on the known and/or collected volume acceleration data ($Q^{Pre}$) and the sound pressure data ($P^{Pre}$) and/or particle velocity data (e.g., $V_x^{Pre}$, $V_y^{Pre}$, $V_z^{Pre}$).

At 712, the apparatus may compute sound data related to the operation of the first machine during the first time period based on the collected vibration data. Computing the sound data, in some aspects, may include multiplying a volume acceleration associated with, or calculated from, the collected vibration data by the measured acoustic transfer function. In some aspects, the volume acceleration may be calculated by multiplying the collected vibration data (e.g., an acceleration vector in a frequency domain) by a representative area. In some aspects, the computed sound data may include one or more of sound pressure data ($P^{Op}$) and/or particle velocity data ($\vec{V}^{Op}$) at one or more locations during the first time period. The computed sound data, in some aspects, includes computed sound data across a continuous range of frequencies including data (e.g., particle velocity data) for frequencies associated with standing waves having nodes at the monitored position (the position of the microphone used in the acoustic transfer function measurement). As discussed above, in some aspects, the particle velocity data may include vector data including a plurality of component particle velocities in a corresponding plurality of component directions.

The computation of the sound data, in some aspects, may include multiple steps to get from collected vibration data to sound data. The steps may include transforming time-domain vibration and/or acceleration data into frequency-domain vibration and/or acceleration data. For example, referring to FIG. 3, the data acquisition program 310 may use an FFT to transform time-domain raw waveform data 314 into frequency-domain acceleration spectrum data 318. Subsequent steps, in some aspects, may include computing volume acceleration data from the frequency-domain vibration and/or acceleration data and a representative area and computing the sound data from the volume acceleration data and the measured acoustic transfer function. For example, referring to FIGS. 4-6, a run-time volume acceleration $Q^{Op}(\omega)$ may be calculated by multiplying the frequency-domain acceleration data $\vec{a}^{Op}(m)$ by a representative area (A) 525 or 625 as in equation (1) 410 of FIG. 4 (e.g., $Q^{Op}(\omega)=\vec{a}^{Op}(\omega)*A$). In turn, the sound data, in some aspects, may be computed by multiplying the run-time volume acceleration $Q^{Op}(\omega)$ (corresponding to monitored and/or measured acceleration data 530 or 630) by the acoustic transfer function 520 or 620 (e.g., $[(P/Q(\omega))^{Pre}$, $(V_x/Q(\omega))^{Pre}$, $(V_y/Q(\omega))^{Pre}$, $(V_z/Q(\omega))^{Pre}]*Q^{Op}(\omega))$ to derive estimated sound data 540 or 640.

Finally, at 714, the apparatus may predict, based on the computed sound data, at least one value associated with a maintenance of the first machine. The prediction, in some aspects, may be based on one or more predictive maintenance programs such as machine-trained networks, deep learning or other predictive maintenance algorithms and/or programs. In some aspects, the predictive maintenance programs may utilize one or more of the vibration data and/or the sound data to predict the at least one value associated with a maintenance of the first machine. The at least one value associated with the maintenance of the first machine, in some aspects, may be one of an anomaly score, an estimated remaining useful lifetime, or a value associated with a predictive maintenance algorithm (e.g., a value associated with some other aspect of predictive maintenance). For example, referring to FIGS. 3, 5, and 6, monitored acceleration data 312 or monitored and/or measured acceleration data 630 may be provided to a first predictive maintenance program 342 or 672 and computed or estimated sound data 540 or 640 may be provided to a second predictive maintenance program 574 or 674 to produce output for predictive maintenance 350, 580, or 680. Additionally, or alternatively, the first predictive maintenance program 672 and the second predictive maintenance program 674 may provide the monitored and/or measured acceleration data 630 and the computed or estimated sound data 640, respectively, to a third predictive maintenance program 676 to produce output for predictive maintenance 680.

The predicted at least one value associated with the maintenance of the first machine may be provided for display to a user (e.g., a manager of an industrial process or factory floor) for remedial action. After outputting the predicated at least one value associated with the maintenance of the first machine, a maintenance operation may be performed to address any issues identified by the prediction.

FIG. 8 is a flow diagram 800 illustrating a method in accordance with some aspects of the disclosure. In some aspects, the method is performed by an analysis apparatus in communication with at least one vibration monitor (e.g., computing device 905 receiving vibration data via input/user interface 935 and I/O interface 925) that collects data and performs various transformations and analyses based on the collected data. At 802, the apparatus may measure an acoustic transfer function relating vibration data related to (or collected during) an operation of at least a first machine to one or more of a sound pressure data or a particle velocity data. In some aspects, measuring the acoustic transfer function at 802 may include, at 804, operating at least one speaker at a location associated with collected vibration data (e.g., at a location of a vibration monitor such as an accelerometer). The speaker may produce a sine sweep sound or an arbitrary known sound such as a known random noise sound. For example, referring to FIG. 2, speaker 220 may be operated to produce a known sound.

Measuring the acoustic transfer function at 802, in some aspects, may include, at 806, collecting (1) volume acceleration data associated with the at least one speaker and (2) one or more of sound pressure data or particle velocity data related to the volume acceleration data during a time period preceding a time period for monitoring the first machine. The collecting operations at 806 may be performed at a quiet time during which noise is below an acceptable and/or threshold level (e.g., a threshold fraction of the collected sound during operation of the speaker at 804). For example, referring to FIG. 2, a sensor at the speaker 220 may be used to collect the known and/or collected volume acceleration data ($Q^{Pre}$) and the microphone 230 and the particle velocity measurement device 235 may collect one or more of sound pressure data ($P^{Pre}$) and/or particle velocity data (e.g., $V_x^{Pre}$, $V_y^{Pre}$, $V_z^{Pre}$) related to the known and/or collected volume acceleration data ($Q^{Pre}$) and/or amplitude data associated with the operation of the speaker 220.

In some aspects, measuring the acoustic transfer function at 802 may include, at 808, calculating the acoustic transfer function based on the collected volume acceleration data and one or more of the collected sound pressure data or the collected particle velocity data. For example, an acoustic transfer function vector $[(P/Q)^{Pre}$, $(V_x/Q)^{Pre}$, $(V_y/Q)^{Pre}$, $(V_z/Q)^{Pre}]$ may be calculated based on the volume acceleration data ($Q^{Pre}$), the sound pressure data ($P^{Pre}$) and the (sound and/or acoustic) particle velocity data ($V_x^{Pre}$, $V_y^{Pre}$, $V_z^{Pre}$) collected at 806. For example, referring to FIG. 2, components 241-244 (e.g., $(P/Q)^{Pre}$, $(V_x/Q)^{Pre}$, $(V_y/Q)^{Pre}$, $(V_z/Q)^{Pre}$) of the acoustic transfer function 240 may be calculated based on the known and/or collected volume acceleration data ($Q^{Pre}$) and the sound pressure data ($P^{Pre}$) and/or particle velocity data (e.g., $V_x^{Pre}$, $V_y^{Pre}$, $V_z^{Pre}$).

At 810, the apparatus may collect vibration data related to an operation of a first machine during a first time period (e.g., a time period associated with an operation of the first machine). The collected vibration data may measure vibration data (e.g., acceleration data) in multiple dimensions (e.g., 2 or 3 dimensions). The vibration data may be measured at a known location associated with the first machine. For example, referring to FIGS. 1, 3, 5, and 6, a vibration monitor 120 may, during an operation of the robotic arm 110 monitor and record monitored acceleration (vibration) data 312 (or monitored and/or measured acceleration data 530/630) which may include (time-domain) raw waveform data 314 and/or (frequency-domain) acceleration spectrum data 318 (e.g., derived from the raw waveform data 314).

At 812, the apparatus may compute sound data related to the operation of the first machine during the first time period based on the collected vibration data. Computing the sound data, in some aspects, may include multiplying a volume acceleration associated with, or calculated from, the collected vibration data by the measured acoustic transfer function. In some aspects, the volume acceleration may be calculated by multiplying the collected vibration data (e.g., an acceleration vector in a frequency domain) by a representative area. In some aspects, the computed sound data may include one or more of sound pressure data ($P^{Op}$) and/or particle velocity data ($\vec{V}^{Op}$) at one or more locations during the first time period. The computed sound data, in some aspects, includes computed sound data across a continuous range of frequencies including data (e.g., particle velocity data) for frequencies associated with standing waves having nodes at the monitored position (the position of the microphone used in the acoustic transfer function measurement). As discussed above, in some aspects, the particle velocity data may include vector data including a plurality of component particle velocities in a corresponding plurality of component directions.

The computation of the sound data, in some aspects, may include multiple steps to get from collected vibration data to sound data. The steps may include transforming time-domain vibration and/or acceleration data into frequency-domain vibration and/or acceleration data. For example, referring to FIG. 3, the data acquisition program 310 may use a FFT to transform time-domain raw waveform data 314 into frequency-domain acceleration spectrum data 318. Subsequent steps, in some aspects, may include computing volume acceleration data from the frequency-domain vibration and/or acceleration data and a representative area and computing the sound data from the volume acceleration data and the measured acoustic transfer function. For example, referring to FIGS. 4-6, a run-time volume acceleration $Q^{Op}(\omega)$ may be calculated by multiplying the frequency-domain acceleration data $\vec{a}^{Op}(\omega)$ by a representative area (A) 525 or 625 as in equation (1) 410 of FIG. 4 (e.g., $Q^{Op}(\omega) = \vec{a}^{Op}(\omega) * A$). In turn, the sound data, in some aspects, may be computed by multiplying the run-time volume acceleration $Q^{Op}(\omega)$ (corresponding to monitored and/or measured acceleration data 530 or 630) by the acoustic transfer function 520 or 620 (e.g., $[(P/Q(\omega))^{Pre}, (V_x/Q(\omega))^{Pre}, (V_y/Q(\omega))^{Pre}, (V_z/Q(\omega))^{Pre}] * Q^{Op}(\omega))$ to derive estimated sound data 540 or 640.

Finally, at 814, the apparatus may predict, based on the computed sound data, at least one value associated with a maintenance of the first machine. The prediction, in some aspects, may be based on one or more predictive maintenance programs such as machine-trained networks, deep learning or other predictive maintenance algorithms and/or programs. In some aspects, the predictive maintenance programs may utilize one or more of the vibration data and/or the sound data to predict the at least one value associated with a maintenance of the first machine. The at least one value associated with the maintenance of the first machine, in some aspects, may be one of an anomaly score, an estimated remaining useful lifetime, or a value associated with a predictive maintenance algorithm (e.g., a value associated with some other aspect of predictive maintenance). For example, referring to FIGS. 3, 5, and 6, monitored acceleration data 312 or monitored and/or measured acceleration data 630 may be provided to a first predictive maintenance program 342 or 672 and computed or estimated sound data 540 or 640 may be provided to a second predictive maintenance program 574 or 674 to produce output for predictive maintenance 350, 580, or 680. Additionally, or alternatively, the first predictive maintenance program 672 and the second predictive maintenance program 674 may provide the monitored and/or measured acceleration data 630 and the computed or estimated sound data 640, respectively, to a third predictive maintenance program 676 to produce output for predictive maintenance 680.

The predicted at least one value associated with the maintenance of the first machine may be provided for display to a user (e.g., a manager of an industrial process or factory floor) for remedial action. After outputting the predicated at least one value associated with the maintenance of the first machine, a maintenance operation may be performed to address any issues identified by the prediction.

As discussed above, the disclosure provides a method and apparatus for predictive maintenance based on both vibration and sound data using an acoustic transfer function measured before a monitored operation of one or more machines. Accordingly, microphones may be used for measuring the acoustic transfer function but not during a run-time, or on a real time, basis. The reduced use of the microphones removes the costs associated with "full-time" acoustic monitoring. For example, the number of microphones may be reduced as the same microphone(s) may be used to measure the acoustic transfer function for multiple monitored machines and the costs of operating the microphones "full-time" may also be reduced or eliminated.

Furthermore, the method and apparatus discussed in the disclosure, in some aspects, may mitigate issues relating to noise that typically arise in sound monitoring. For example, when a microphone is placed near a machine in a factory, there are usually many other sound sources (e.g., other machines in operations). On the other hand, vibration data usually have much less noise than sound data. The acoustic transfer function can be measured when the surrounding environment is quiet (e.g., at night in the factory). Therefore, by using the vibration data with the acoustic transfer function, estimated sound can have less noise than directly measured sound. Consequently, the predictive maintenance analysis described in accordance with some aspects of the disclosure may be more accurate than an analysis based on noisy sound data acquired during operation of multiple machines and in the presence of human workers.

Figure 9:
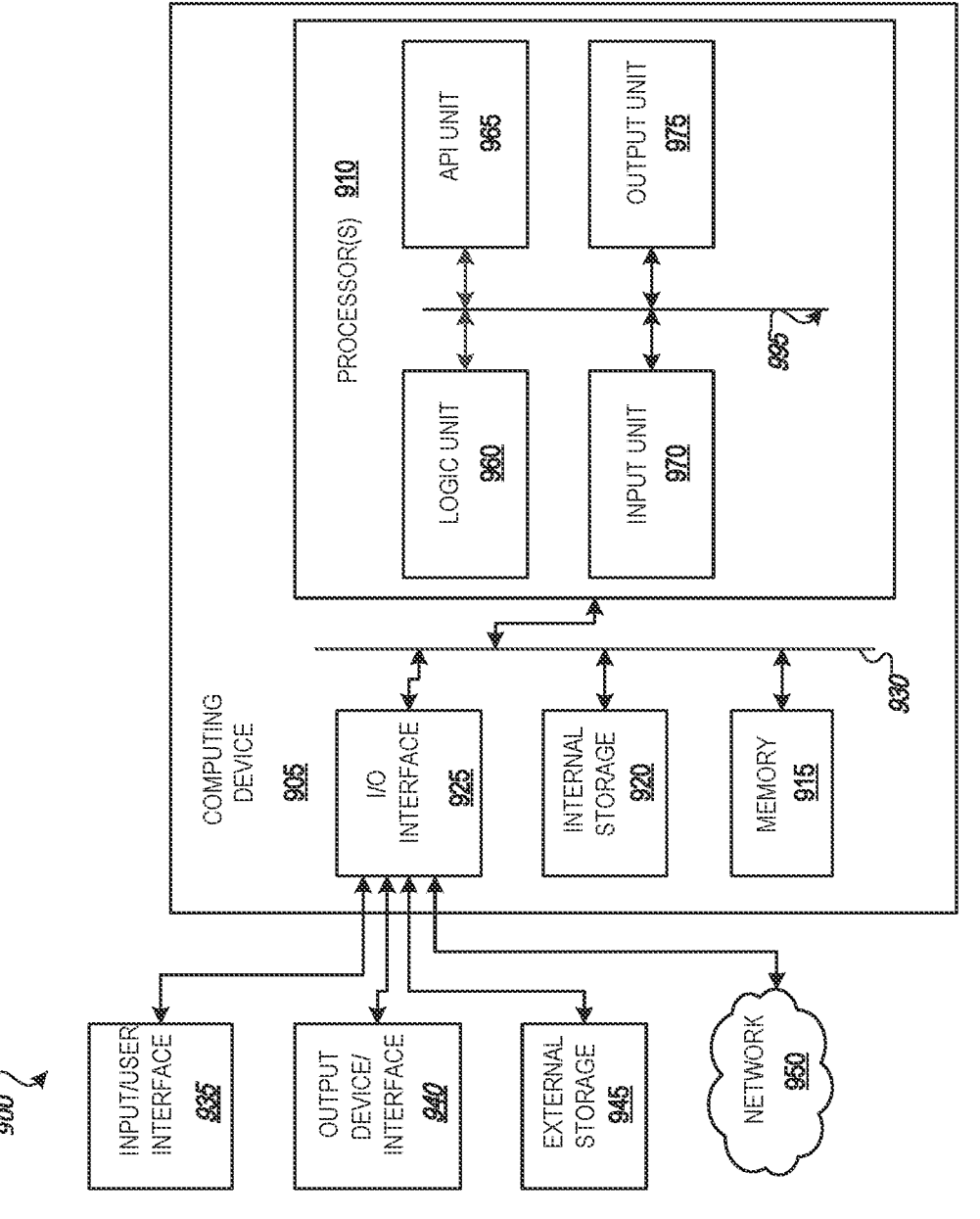
FIG. 9 illustrates an example computing environment with an example computer device suitable for use in some example implementations.

FIG. 9 illustrates an example computing environment with an example computer device suitable for use in some example implementations. Computer device 905 in computing environment 900 can include one or more processing units, cores, or processors 910, memory 915 (e.g., RAM, ROM, and/or the like), internal storage 920 (e.g., magnetic, optical, solid-state storage, and/or organic), and/or IO interface 925, any of which can be coupled on a communication mechanism or bus 930 for communicating information or embedded in the computer device 905. IO interface 925 is also configured to receive images from cameras or provide images to projectors or displays, depending on the desired implementation.

Computer device 905 can be communicatively coupled to input/user interface 935 and output device/interface 940.

Either one or both of the input/user interface 935 and output device/interface 940 can be a wired or wireless interface and can be detachable. Input/user interface 935 may include any device, component, sensor, or interface, physical or virtual, that can be used to provide input (e.g., buttons, touch-screen interface, keyboard, a pointing/cursor control, microphone, camera, braille, motion sensor, accelerometer, optical reader, and/or the like). Output device/interface 940 may include a display, television, monitor, printer, speaker, braille, or the like. In some example implementations, input/user interface 935 and output device/interface 940 can be embedded with or physically coupled to the computer device 905. In other example implementations, other computer devices may function as or provide the functions of input/user interface 935 and output device/interface 940 for a computer device 905.

Examples of computer device 905 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 905 can be communicatively coupled (e.g., via IO interface 925) to external storage 945 and network 950 for communicating with any number of networked components, devices, and systems, including one or more computer devices of the same or different configuration. Computer device 905 or any connected computer device can be functioning as, providing services of, or referred to as a server, client, thin server, general machine, special-purpose machine, or another label.

IO interface 925 can include but is not limited to, wired and/or wireless interfaces using any communication or IO protocols or standards (e.g., Ethernet, 902.11x, Universal System Bus, WiMax, modem, a cellular network protocol, and the like) for communicating information to and/or from at least all the connected components, devices, and network in computing environment 900. Network 950 can be any network or combination of networks (e.g., the Internet, local area network, wide area network, a telephonic network, a cellular network, satellite network, and the like).

Computer device 905 can use and/or communicate using computer-usable or computer readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid-state media (e.g., RAM, ROM, flash memory, solid-state storage), and other non-volatile storage or memory.

Computer device 905 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 910 can execute under any operating system (OS) (not shown), in a native or virtual environment. One or more applications can be deployed that include logic unit 960, application programming interface (API) unit 965, input unit 970, output unit 975, and inter-unit communication mechanism 995 for the different units to communicate with each other, with the OS, and with other applications (not shown). The described units and elements can be varied in design, function, configuration, or implementation and are not limited to the descriptions provided. Processor(s) 910 can be in the form of hardware processors such as central processing units (CPUs) or in a combination of hardware and software units.

In some example implementations, when information or an execution instruction is received by API unit 965, it may be communicated to one or more other units (e.g., logic unit 960, input unit 970, output unit 975). In some instances, logic unit 960 may be configured to control the information flow among the units and direct the services provided by API unit 965, the input unit 970, the output unit 975, in some example implementations described above. For example, the flow of one or more processes or implementations may be controlled by logic unit 960 alone or in conjunction with API unit 965. The input unit 970 may be configured to obtain input for the calculations described in the example implementations, and the output unit 975 may be configured to provide an output based on the calculations described in example implementations.

Processor(s) 910 can be configured to collect vibration data related to an operation of a first machine during a first time period. The processor(s) 910 can be configured to compute sound data related to the operation of the first machine during the first time period based on the collected vibration data. The processor(s) 910 can be configured to predict, based on the computed sound data, at least one value associated with a maintenance of the first machine. The processor(s) 910 may also be configured to measure an acoustic transfer function relating the vibration data related to the operation of the first machine to one or more of the sound pressure data or the particle velocity data. The processor(s) 910 may also be configured to operate at least one speaker at a location associated with the collected vibration data. The processor(s) 910 may also be configured to collect (1) volume acceleration data associated with the at least one speaker and (2) one or more of sound pressure data or particle velocity data related to the volume acceleration data during a second, different time period preceding the first time period. The processor(s) 910 may also be configured to calculate the acoustic transfer function based on the collected volume acceleration data and one or more of the collected sound pressure data or the collected particle velocity data.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer readable storage medium or a computer readable signal medium. A computer readable storage medium may involve tangible mediums such as, but not limited to optical disks, magnetic disks, read-only memories, random access memories, solid-state devices, and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method comprising:

collecting vibration data related to an operation of a first machine during a first time period using at least one vibration sensor positioned at a known location on the first machine;

computing sound data related to the operation of the first machine during the first time period based on the collected vibration data and a pre-measured acoustic transfer function, wherein the pre-measured acoustic transfer function relates vibration data to sound data and was measured during a quiet time period preceding the first time period by operating at least one speaker at the known location and collecting volume acceleration data and at least one of sound pressure data or particle velocity data, and wherein the computed sound data has less noise than directly measured sound data would have during the first time period;

predicting, based on the computed sound data, at least one value associated with a maintenance of the first machine; and using the predicted at least one value to perform or schedule a maintenance operation on the first machine.

2. The method of claim 1, wherein the computed sound data comprises one or more of sound pressure data or particle velocity data at one or more locations during the first time period.

3. The method of claim 2, wherein the computed sound data comprises sound pressure data and particle velocity data associated with at least one location of the one or more locations.

4. The method of claim 2, wherein the pre-measured acoustic transfer function was measured by:

operating, during the quiet time period, the at least one speaker at the known location associated with the collected vibration data;

collecting, during the quiet time period, (1) the volume acceleration data associated with the at least one speaker and (2) one or more of the sound pressure data or the particle velocity data related to the volume acceleration data; and calculating the pre-measured acoustic transfer function based on the collected volume acceleration data and one or more of the collected sound pressure data or the collected particle velocity data.

5. The method of claim 2, wherein the particle velocity data comprises vector data comprising a plurality of component particle velocities in a corresponding plurality of component directions.

6. The method of claim 1, wherein the at least one value associated with the maintenance of the first machine is one of an anomaly score, an estimated remaining useful lifetime, or a value associated with a predictive maintenance algorithm.

7. An apparatus comprising:

a memory; and at least one processor coupled to the memory and, based at least in part on information stored in the memory, the at least one processor is configured to:

collect vibration data related to an operation of a first machine during a first time period from at least one vibration sensor positioned at a known location on the first machine:

compute sound data related to the operation of the first machine during the first time period based on the collected vibration data and a pre-measured acoustic transfer function, wherein the pre-measured acoustic transfer function relates vibration data to sound data and was measured during a quiet time period preceding the first time period by operating at least one speaker at the known location and collecting volume acceleration data and at least one of sound pressure data or particle velocity data, and wherein the computed sound data has less noise than directly measured sound data would have during the first time period;

predict, based on the computed sound data, at least one value associated with a maintenance of the first machine; and use the predicted at least one value to perform or schedule a maintenance operation on the first machine.

8. The apparatus of claim 7, wherein the computed sound data comprises one or more of sound pressure data or particle velocity data at one or more locations during the first time period.

9. The apparatus of claim 8, wherein the computed sound data comprises sound pressure data and particle velocity data associated with at least one location of the one or more locations.

10. The apparatus of claim 8, wherein the pre-measured acoustic transfer function was measured by the at least one processor being configured to:

operate, during the quiet time period, the at least one speaker at the known location associated with the collected vibration data;

collect, during the quiet time period, (1) the volume acceleration data associated with the at least one speaker and (2) one or more of the sound pressure data or the particle velocity data related to the volume acceleration data; and calculate the pre-measured acoustic transfer function based on the collected volume acceleration data and one or more of the collected sound pressure data or the collected particle velocity data.

11. The apparatus of claim 8, wherein the particle velocity data comprises vector data comprising a plurality of component particle velocities in a corresponding plurality of component directions.

12. The apparatus of claim 7, wherein the at least one value associated with the maintenance of the first machine is one of an anomaly score, an estimated remaining useful lifetime, or a value associated with a predictive maintenance algorithm.

13. A non-transitory computer-readable medium storing computer executable code, the computer executable code when executed by a processor causes the processor to:

collect vibration data related to an operation of a first machine during a first time period from at least one vibration sensor positioned at a known location on the first machine;

compute sound data related to the operation of the first machine during the first time period based on the collected vibration data and a pre-measured acoustic transfer function, wherein the pre-measured acoustic transfer function relates vibration data to sound data and was measured during a quiet time period preceding the first time period by operating at least one speaker at the known location and collecting volume acceleration data and at least one of sound pressure data or particle velocity data, and wherein the computed sound data has less noise than directly measured sound data would have during the first time period;

predict, based on the computed sound data, at least one value associated with a maintenance of the first machine; and use the predicted at least one value to perform or schedule a maintenance operation on the first machine.

14. The non-transitory computer-readable medium of claim 13, wherein the computed sound data comprises one or more of sound pressure data or particle velocity data at one or more locations during the first time period.

15. The non-transitory computer-readable medium of claim 14, wherein the pre-measured acoustic transfer function was measured by the processor being configured to:

operate, during the quiet time period, the at least one speaker at the known location associated with the collected vibration data;

collect, during the quiet time period, (1) the volume acceleration data associated with the at least one speaker and (2) one or more of the sound pressure data or the particle velocity data related to the volume acceleration data; and calculate the pre-measured acoustic transfer function based on the collected volume acceleration data and one or more of the collected sound pressure data or the collected particle velocity data.

16. The non-transitory computer-readable medium of claim 14, wherein the particle velocity data comprises vector data comprising a plurality of component particle velocities in a corresponding plurality of component directions.

17. The non-transitory computer-readable medium of claim 13, wherein the at least one value associated with the maintenance of the first machine is one of an anomaly score, an estimated remaining useful lifetime, or a value associated with a predictive maintenance algorithm.

* * * * *